United States Patent
Hogstrom et al.

(10) Patent No.: US 7,114,152 B2
(45) Date of Patent: Sep. 26, 2006

(54) METHOD, APPARATUS, AND PROGRAM TO DETERMINE THE MUTABILITY OF AN OBJECT AT LOADING TIME

(75) Inventors: Matt Richard Hogstrom, Apex, NC (US); Robert W. St. John, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 571 days.

(21) Appl. No.: 10/041,127

(22) Filed: Jan. 8, 2002

(65) Prior Publication Data

US 2003/0131348 A1    Jul. 10, 2003

(51) Int. Cl.
G06F 9/44    (2006.01)

(52) U.S. Cl. ............. 717/166; 717/163; 717/164; 709/203

(58) Field of Classification Search ............ 717/108, 717/126, 151, 152, 162–167, 140, 114–119; 707/103 R; 719/332; 379/300; 709/203; 713/201

See application file for complete search history.

(56) References Cited

U.S. PATENT DOCUMENTS

| | | | |
|---|---|---|---|
| 5,412,717 A | 5/1995 | Fischer | 380/4 |
| 5,583,988 A | 12/1996 | Crank et al. | 395/185.01 |
| 5,815,718 A | 9/1998 | Tock | 395/705 |
| 5,889,992 A * | 3/1999 | Koerber | 717/108 |
| 5,946,487 A * | 8/1999 | Dangelo | 717/148 |
| 5,966,542 A | 10/1999 | Tock | 395/712 |
| 6,072,953 A * | 6/2000 | Cohen et al. | 717/166 |
| 6,223,346 B1 | 4/2001 | Tock | 717/11 |
| 6,405,367 B1 * | 6/2002 | Bryant et al. | 717/115 |
| 6,438,560 B1 * | 8/2002 | Loen | 707/103 R |
| 6,442,753 B1 * | 8/2002 | Gerard et al. | 717/170 |
| 6,466,328 B1 * | 10/2002 | Bradley et al. | 709/203 |
| 6,499,137 B1 * | 12/2002 | Hunt | 717/164 |
| 6,631,517 B1 * | 10/2003 | Lamping et al. | 717/151 |
| 6,658,492 B1 * | 12/2003 | Kawahara et al. | 719/332 |

(Continued)

FOREIGN PATENT DOCUMENTS

WO    WO 99/49392    9/1999

OTHER PUBLICATIONS

Kindel, COM: what makes it work, black-box encapsulation through multiple, immutable interfaces, IEEE, Oct. 24-26, 1997, pp.: 68-77.*

(Continued)

*Primary Examiner*—Wei Zhen
*Assistant Examiner*—Satish S. Rampuria
(74) *Attorney, Agent, or Firm*—A. Bruce Clay; Yee & Associates, P.C.

(57) ABSTRACT

A mutability mechanism is provided for parsing an object at loading time. The mutability mechanism inserts a property into the object that indicates whether or not the object is immutable. The mutability mechanism looks at the code for the object and determines whether any other objects can modify the object. If the object cannot be modified after it is created, then the new property is set to indicate that the object is immutable; otherwise, the property is set to indicate that the object is mutable. This property can be inspected at runtime when a call is made to a program object. If an object passed as an argument is marked mutable, a clone of this object must be passed to the callee. However, if an object passed as an argument is marked immutable, a simple reference to the object may be passed as an argument to the callee.

16 Claims, 5 Drawing Sheets

U.S. PATENT DOCUMENTS

| | | | |
|---|---|---|---|
| 6,675,375 B1* | 1/2004 | Czajkowski | 717/151 |
| 6,681,381 B1* | 1/2004 | Soepenberg et al. | 717/118 |
| 6,701,520 B1* | 3/2004 | Santosuosso et al. | 717/152 |
| 6,708,276 B1* | 3/2004 | Yarsa et al. | 713/201 |
| 2002/0016864 A1* | 2/2002 | Brett | 709/315 |
| 2002/0038301 A1* | 3/2002 | Aridor et al. | 707/10 |
| 2002/0147971 A1* | 10/2002 | Adams | 717/165 |
| 2002/0174414 A1* | 11/2002 | Matsuo et al. | 717/126 |
| 2003/0059030 A1* | 3/2003 | Tenorio | 379/300 |
| 2003/0167297 A1* | 9/2003 | Kumar et al. | 709/203 |

OTHER PUBLICATIONS

Martin, Explicit reference counts, IEEE, Apr. 11-14, 1996, pp.: 707-710.*

Yasugi et al., Eliminating bottlenecks on parallel systems using adaptive objects, IEEE, Oct. 12-18, 1998, pp.: 80-87.*

Microsoft Computer Dicitonary, Microsoft Press, 1997, 3rd Edition, pp.: 198-199.*

Martin, Explicit reference counts, IEEE, Apr. 11-14, 1996 pp. 707-710.*

Poole et al., Combining functional and object-oriented programming methodolodies in a large commerical application, IEEE, May 14-16, 1998 pp. 111-117.*

Kopec, The signal representation language SRL, IEEE, vol. 8, Apr. 1983 pp. 1168-1171.*

Chuang et al., Non-Intrusive Object Introspection in C++: Architecture and Application, Proceedings of the 1998 International Conference on Software Engineering. Forging New Links (Cat.No. 98CB36139), pp. 312-321, Published Los Alamitos, CA, USA, 1998, xiv+521 pp., abstract.

Murray, DJ et al., "Automated Debugging in Java using OCL and JDI", Proceedings of the Fourth International Workshop on Automate Debugging. AADEBUG 2000, pp. 266-271, Published Rennes, France, 2000, vi+277 pp., abstract.

Laufer, K et al., "Safe Structural Conformance for Java", Computer Journal, vol. 43, No. 6, pp. 469-481, 2000, abstract.

Czajkowski, G., "Application Isolation in the Java™ Virtual Machine", SIGPLAN Notices, vol. 35, NO. 10, pp. 354-366, Oct. 2000, abstract.

Scott, TA., "Java Security and How to Play Outside the Java Sandbox", Journal of Computing in Small Colleges, vol. 15, No. 1, pp. 114-125, Nov. 1999, abstract.

Koksal, P. et al., "A Component-Based Workflow System with Dynamic Modifications", Next Generation Information Technologies and Systems. 4th International Workshop, NGITS'99. Proceedings (Lecture Notes in Computer Science vol. 1649), pp. 238-255, Published Berlin, Germany, 1999, ix+325pp., abstract.

Karaorman, M. et al., "jContractor: a Reflective Java Library to Support Design by Contract", Meta-Level Architectures and Reflection. Second International Conference, Reflection '99. Proceedings (Lecture Notes in Computer Science vol. 1616), pp. 175-196, Published Berlin, Germany, 1999, xi+272pp., abstract.

Cohen, GA et al., "Automatic Program Transformation with JOIE", Proceedings of the USENIX 1998 Annual Technical Conference, pp. 167-178, Published Berkeley CA USA 1998, vi+282pp., abstract.

Jensen, T. et al., "Security and Dynamic Class Loading in Java: a Formalisation", Proceedings 1998 International Conference on Computer Languages (CAt.No. 98CB36225), pp. 4-15, Published Los Alamitos, CA, USA, 1998, x+282 pp., abstract.

Agesen, O. et al., "Adding Type Parameterization to the Java Language", SIGPLAN Notices, vol. 32, No. 10, pp. 49-65, Oct. 1997, abstract.

Small, C., "A Tool for Construction Safe Extensible C++ Sytstems", Proceedings of the Third USENIX Conference on Object-Oriented Technologies and Systems (COOTS), pp. 175-184, Published Berkeley, CA, USA, 1997, 248 pp., abstract.

Hsieh, Cha et al., "Java Bytecode to Native Code Translation: the Caffeine Protoype and Preliminary Results", Proceedings of the 29th Annual IEEE/ACM International Symposium on Microarchitecture. MICRO-29. (Cat.No. 96TB100075), pp. 90-97, Published Losa Alamitos, CA, USA, 1996 xii+359 pp., abstract.

* cited by examiner

METHOD, APPARATUS, AND PROGRAM TO DETERMINE THE MUTABILITY OF AN OBJECT AT LOADING TIME

FIELD OF THE INVENTION

The present invention relates to data processing and, in particular, to passing objects as arguments when invoking program objects. Still more particularly, the present invention provides a method, apparatus, and program to determine the mutability of an object at loading time to avoid unnecessarily making a copy of the object which will be passed as a parameter to another method.

BACKGROUND OF THE INVENTION

Java is an object oriented programming language and environment focusing on defining data as objects and the methods that may be applied to those objects. Java supports only a single inheritance, meaning that each class can inherit from only one other class at any given time. Java also allows for the creation of totally abstract classes known as interfaces, which allow the defining of methods that may be shared with several classes without regard for how other classes are handling the methods. Java provides a mechanism to distribute software and extends the capabilities of a Web browser because programmers can write an applet once and the applet can be run on any Java enabled machine on the Web.

Java objects may invoke other Java objects. Enterprise Java Beans (EJB) is a component software architecture that is used to build Java applications (objects) that run in a server. EJB uses a "container" layer that provides common functions such as security and transaction support and delivers a consistent interface to the applications regardless of the type of server.

Currently, the EJB 1.0 and 1.1 specification requires the implementation of a call by value as opposed to a call by reference for the invocation of EJBs. This same requirement may apply to future versions of the EJB or other programming specifications. When the EJB lives in the same container as the caller, it is more efficient to pass a reference to objects used by the EJB rather than making a copy of the object. However, passing a reference exposes the caller to corruption of the passed object.

There are instances, however, when a passed object does not need to be copied because it is immutable, meaning that once the object is created it cannot be modified. In these instances, the object may be referenced because there is no danger of corruption and the semantic of pass by value is maintained.

In the prior art, the solution used by Application Server vendors is to provide an override at runtime allowing the customer to choose to pass by reference rather than by value. Although this provides better performance, it also exposes the customer to a violation of the EJB specification and the object may be corrupted if it is not immutable.

Therefore, it would be advantageous to provide a method, apparatus, and program to determine the mutability of an object at loading time to avoid unnecessarily copying an object when passing the object as an argument when invoking a program object.

SUMMARY OF THE INVENTION

The present invention provides a mutability mechanism for parsing an object at loading time. The mutability mechanism inserts a property into the object that indicates whether or not the object is immutable. The mutability mechanism inspects the code for the object and determines whether any other objects can modify the object. If the object of interest cannot be modified by other objects, then the new property is set to indicate that the object is immutable; otherwise, the property is set to indicate that the object is mutable. This property can be inspected at runtime to determine if the object needs to be copied. If the object is immutable, a reference to the object is passed as an argument.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
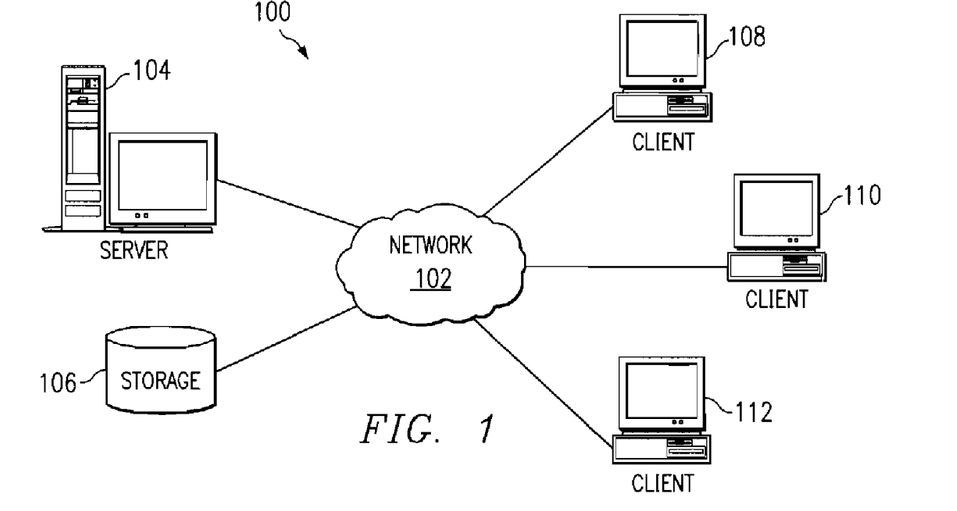
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
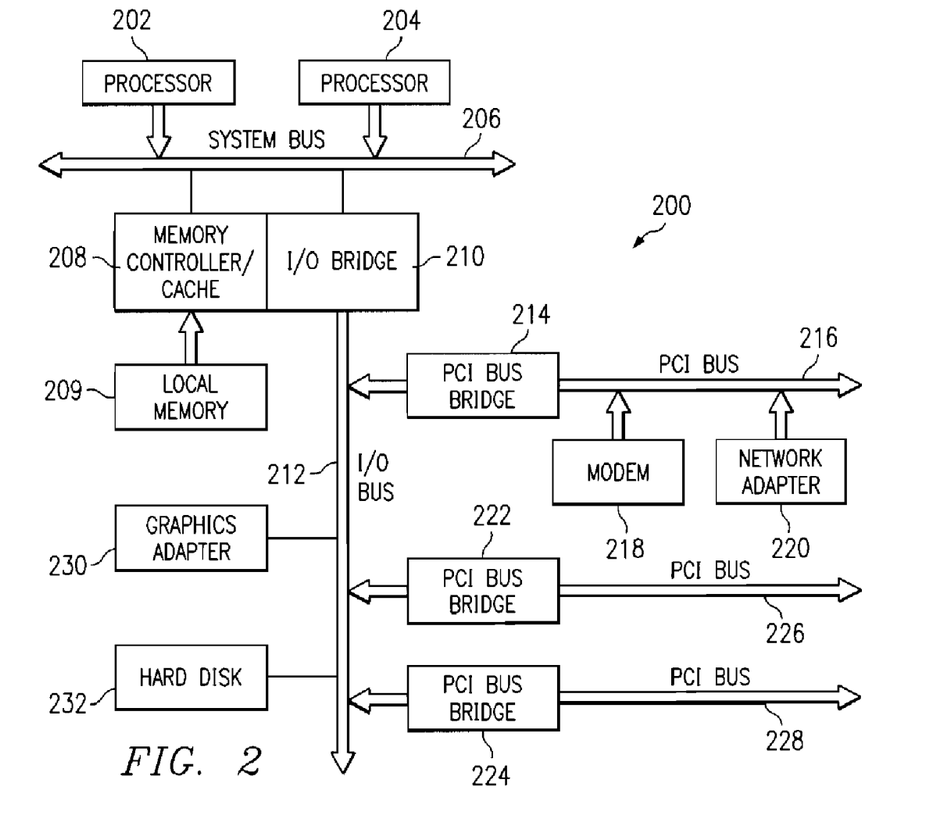
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
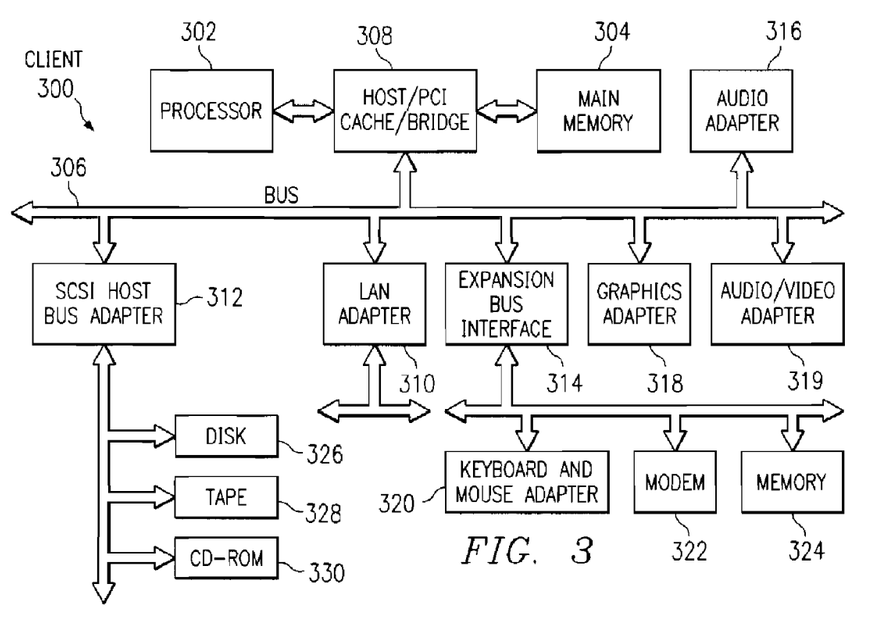
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards.

In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
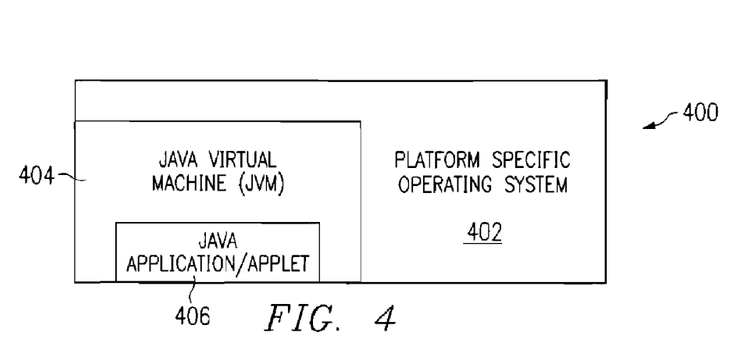
FIG. 4 is a block diagram illustrating the relationship of software components operating within a computer system that may implement the present invention.

With reference now to FIG. 4, a block diagram illustrates the relationship of software components operating within a computer system that may implement the present invention. Java-based system 400 contains platform specific operating system 402 that provides hardware and system support to software executing on a specific hardware platform. JVM 404 is one software application that may execute in conjunction with the operating system. JVM 404 provides a Java run-time environment with the ability to execute Java application or applet 406, which is a program, servlet, or software component written in the Java programming language. The computer system in which JVM 404 operates may be similar to data processing system 200 or data processing system 300 described above. However, JVM 404 may be implemented in dedicated hardware on a so-called Java chip, Java-on-silicon, or Java processor with an embedded picoJava core.

At the center of a Java run-time environment is the JVM, which supports all aspects of Java's environment, including its architecture, security features, mobility across networks, and platform independence.

The JVM is a virtual computer, i.e. a computer that is specified abstractly. The specification defines certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for mainframe computers and PDAs.

The JVM is the name of a virtual computer component that actually executes Java programs. Java programs are not run directly by the central processor but instead by the JVM, which is itself a piece of software running on the processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures.

To enable a Java application to execute on different types of data processing systems, a compiler typically generates an architecture-neutral file format—the compiled code is executable on many processors, given the presence of the Java run-time system. The Java compiler generates bytecode instructions that are nonspecific to a particular computer architecture. A bytecode is a machine independent code generated by the Java compiler and executed by a Java interpreter. A Java interpreter is part of the JVM that alternately decodes and interprets a bytecode or bytecodes. These bytecode instructions are designed to be easy to interpret on any computer and easily translated on the fly into native machine code. Bytecodes may be translated into native code by a just-in-time compiler or JIT.

A JVM loads class files and executes the bytecodes within them. The class files are loaded by a class loader in the JVM. The class loader loads class files from an application and the class files from the Java application programming interfaces (APIs) which are needed by the application. The execution engine that executes the bytecodes may vary across platforms and implementations.

One type of software-based execution engine is a just-in-time compiler. With this type of execution, the bytecodes of a method are compiled to native machine code upon successful fulfillment of some type of criteria for jitting a method. The native machine code for the method is then cached and reused upon the next invocation of the method. The execution engine may also be implemented in hardware and embedded on a chip so that the Java bytecodes are executed natively. JVMs usually interpret bytecodes, but JVMs may also use other techniques, such as just-in-time compiling, to execute bytecodes.

When an application is executed on a JVM that is implemented in software on a platform-specific operating system, a Java application may interact with the host operating system by invoking native methods. A Java method is written in the Java language, compiled to bytecodes, and stored in class files. A native method is written in some other language and compiled to the native machine code of a particular processor. Native methods are stored in a dynamically linked library whose exact form is platform specific.

Figure 5:
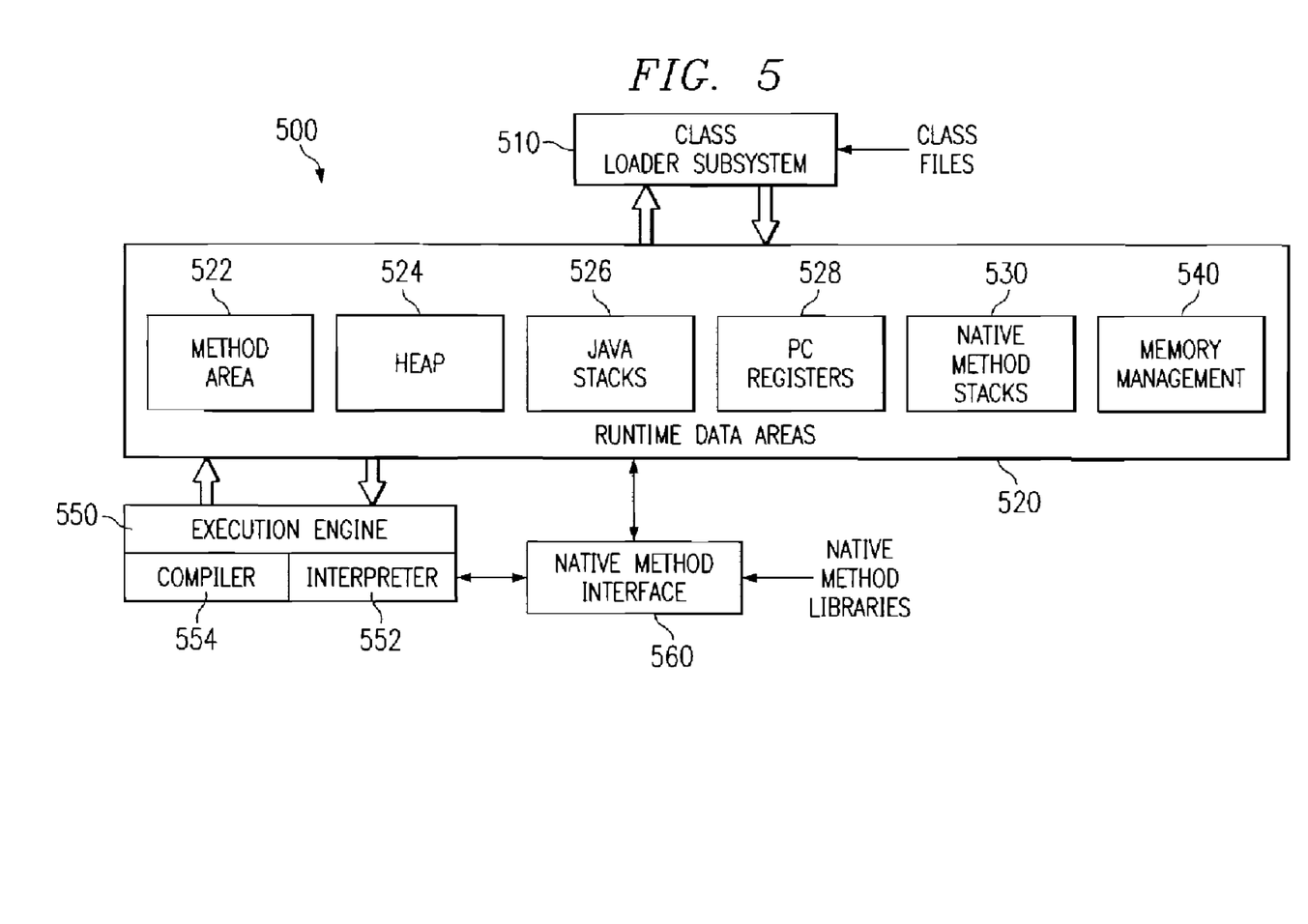
FIG. 5 is a block diagram of a Java Virtual Machine in accordance with a preferred embodiment of the present invention.

With reference now to FIG. 5, a block diagram of a JVM is depicted in accordance with a preferred embodiment of the present invention. JVM 500 includes a class loader subsystem 510, which is a mechanism for loading types, such as classes and interfaces, given fully qualified names. JVM 500 also contains runtime data areas 520, execution engine 550, native method interface 560, and memory management 540. Execution engine 550 is a mechanism for executing instructions contained in the methods of classes loaded by class loader subsystem 510. Execution engine 550 may be, for example, Java interpreter 552 or just-in-time compiler 554. Native method interface 560 allows access to resources in the underlying operating system. Native method interface 560 may be, for example, a Java native interface. Runtime data areas 520 contain native method stacks 530, Java stacks 526, PC registers 528, method area 522, and heap 524. These different data areas represent the organization of memory needed by JVM 500 to execute a program.

Java stacks 526 are used to store the state of Java method invocations. When a new thread is launched, the JVM creates a new Java stack for the thread. The JVM performs only two operations directly on Java stacks: it pushes and pops frames. A thread's Java stack stores the state of Java method invocations for the thread. The state of a Java method invocation includes its local variables, the parameters with which it was invoked, its return value, if any, and intermediate calculations. Java stacks are composed of stack frames. A stack frame contains the state of a single Java method invocation. When a thread invokes a method, the JVM pushes a new frame onto the Java stack of the thread. When the method completes, the JVM pops the frame for that method and discards it. The JVM does not have any registers for holding intermediate values; any Java instruction that requires or produces an intermediate value uses the stack for holding the intermediate values. In this manner, the Java instruction set is well-defined for a variety of platform architectures.

PC registers 528 are used to indicate the next instruction to be executed. Each instantiated thread gets its own pc register (program counter) and Java stack. If the thread is executing a JVM method, the value of the pc register indicates the next instruction to execute. If the thread is executing a native method, then the contents of the pc register are undefined. Native method stacks 530 store the state of invocations of native methods. The state of native method invocations is stored in an implementation-dependent way in native method stacks, registers, or other implementation-dependent memory areas. In some JVM implementations, native method stacks 530 and Java stacks 526 are combined.

Method area 522 contains class data while heap 524 contains all instantiated objects. The JVM specification strictly defines data types and operations. Most JVMs choose to have one method area and one heap, each of which are shared by all threads running inside the JVM. When the JVM loads a class file, it parses information about a type from the binary data contained in the class file. It places this type information into the method area. Each time a class instance or array is created, the memory for the new object is allocated from heap 524. JVM 500 includes an instruction that allocates memory space within the memory for heap 524 but includes no instruction for freeing that space within the memory. Memory management 540 in the depicted example manages memory space within the memory allocated to heap 524. Memory management 540 may include a garbage collector, which automatically reclaims memory used by objects that are no longer referenced. Additionally, a garbage collector also may move objects to reduce heap fragmentation.

An Enterprise Java Bean is a software component that is used to build Java applications that run in a server. EJBs use a container layer that provides common functions such as security and transaction support and delivers a consistent interface to the applications regardless of the type of server. When a method is called by a client, the container signals the EJB instance. The EJB may then begin processing the method call. The EJB may reside in the same container as the caller.

Figure 6A:
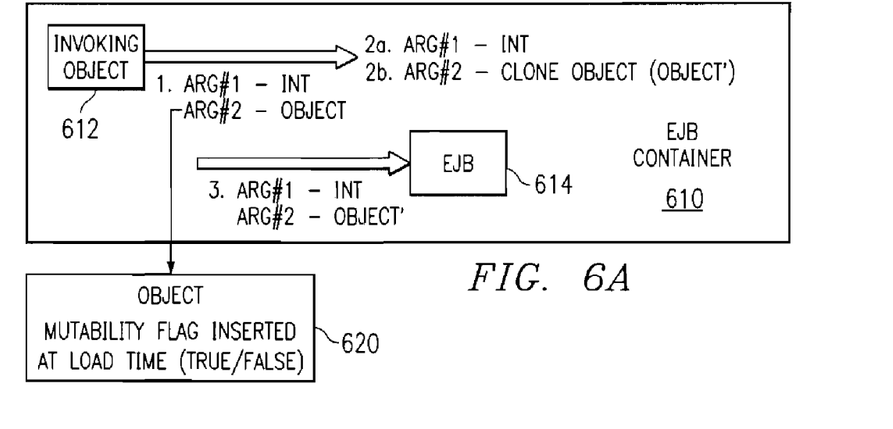
FIGS. 6A–6C are block diagrams illustrating an invoking object and an Enterprise Java Bean in a container in accordance with a preferred embodiment of the present invention.
Figure 6B:
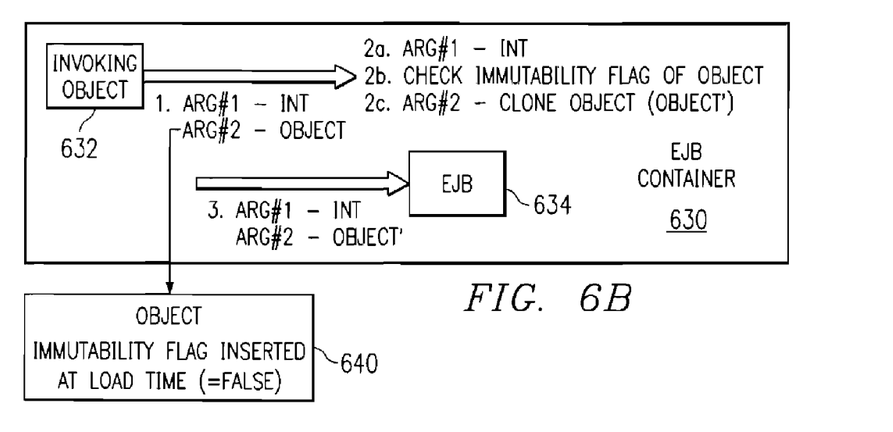
Figure 6C:
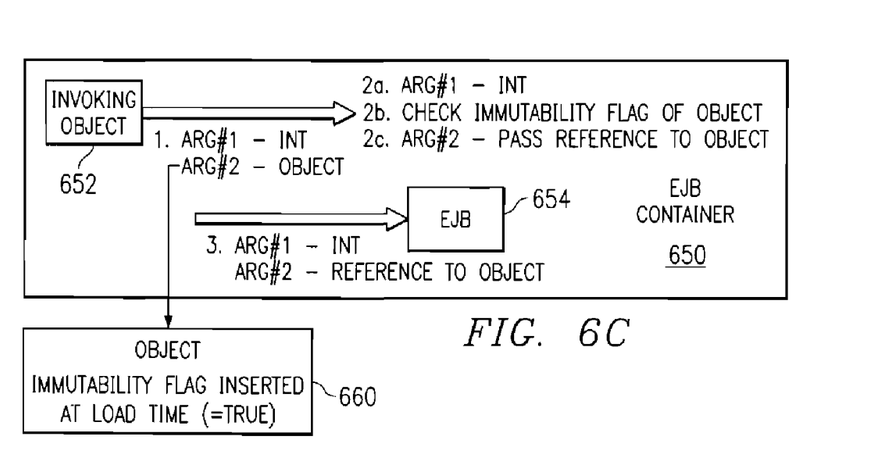

With reference to FIGS. 6A–6C, block diagrams illustrating an invoking object and an EJB in a container in accordance with a preferred embodiment of the present invention. Particularly, with reference to FIG. 6A, EJB container 610 contains invoking object 612 and EJB 614. The invoking object calls the EJB with argument #1 being an integer and argument #2 being an object (step 1). The EJB container passes the integer (arg#1) directly (step 2a) and makes a copy of the object (arg#2) to form a clone object (step 2b). Thereafter, the EJB container invokes the EJB with the integer and the clone object as arguments (step 3).

When an EJB resides in the same container as the caller, it would be more efficient to pass a reference to objects used by the EJB rather than making a copy of the object. However, passing a reference exposes the caller to corruption of the passed object when a reference rather than a copy is made. There are instances, however, when an object does not need to be copied because it is immutable, meaning that once it is created it cannot be modified. In this case, the object need not be copied because there is no danger of corruption.

In accordance with a preferred embodiment of the present invention, a mutability mechanism is provided that parses bytecode at class loading time and inserts a property that indicates whether or not a class is immutable. This mechanism may be embodied in class loader subsystem 510 in FIG. 5.

In the example shown in FIG. 6A, object 620 is passed as an argument. The mutability mechanism parses object 620 and determines whether any method can modify the object after it is created. If the object cannot be modified after it is created, then the immutability flag is set to "true" to indicate that the class is immutable; otherwise, if the mutability cannot be determined or it is proven to be mutable, then the immutability flag is set to "false." The container may subsequently inspect this property at runtime to determine if a class needs to be copied.

The determination of whether the object is immutable may inspect the object to determine whether all the properties are marked private. The determination may also comprise determining whether there are any non-private methods that update properties in the object. If all the properties are marked private and there are no non-private methods that update properties in the object, then the object is immutable. The determination of immutability may also comprise other tests that may be known in the art.

With reference now to FIG. 6B, an example in which a mutable object is passed as an argument is shown. Invoking object 632 calls EJB 634 with argument #1 being an integer and argument #2 being object 640 (step 1). EJB container 630 passes the integer (arg#1) directly (step 2a). The EJB container then checks the immutability flag of the object (step 2b). Since the immutability flag is set to "false," the container makes a copy of the object (arg#2) to form a clone object (step 2c). Thereafter, the EJB container invokes the EJB with the integer and the clone object as arguments (step 3).

Turning now to FIG. 6C, an example in which an immutable object is passed as an argument is shown. Invoking object 652 calls EJB 654 with argument #1 being an integer and argument #2 being object 660 (step 1). EJB container 650 passes the integer (arg#1) directly (step 2a). The EJB container then checks the immutability flag of the object (step 2b). Since the immutability flag is set to "true," the container passes a reference to the object (arg#2) (step 2c). Thereafter, the EJB container invokes the EJB with the integer and the reference to the object as arguments (step 3).

Figure 7:
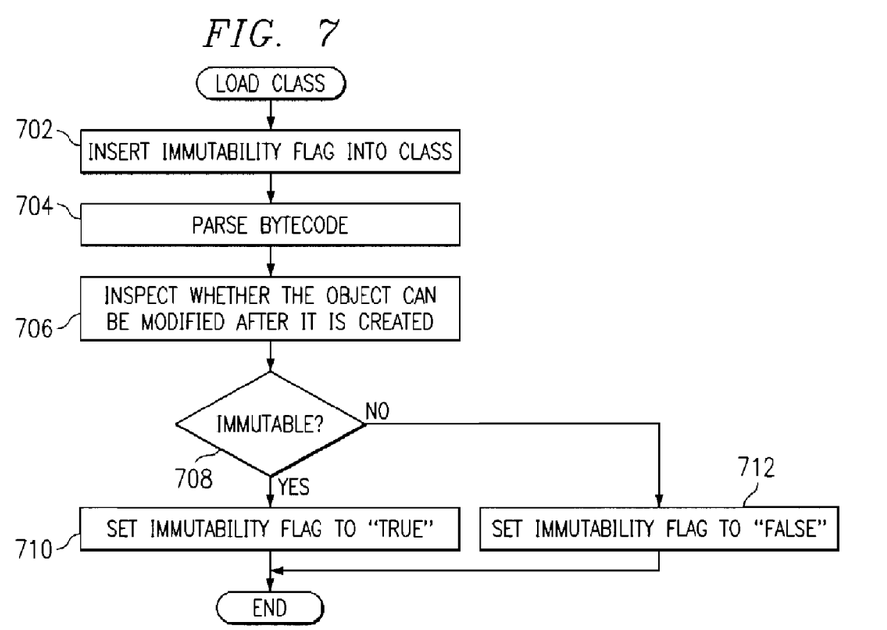
FIG. 7 is a flowchart of the operation of a class loading system in accordance with a preferred embodiment of the present invention.

With reference to FIG. 7, a flowchart of the operation of a class loading system is shown in accordance with a preferred embodiment of the present invention. The process begins by loading a class and inserts the immutability flag into the class (step 702). The process then parses the bytecode of the class (step 704) and inspects whether the object can be modified after it is created (step 706).

A determination is made as to whether the object is immutable (step 708). If the object is immutable, the process sets the immutability flag to "true" (step 710) and ends. However, if the object is not immutable in step 708, the process sets the immutability flag to "false" (step 712) and ends.

Figure 8:
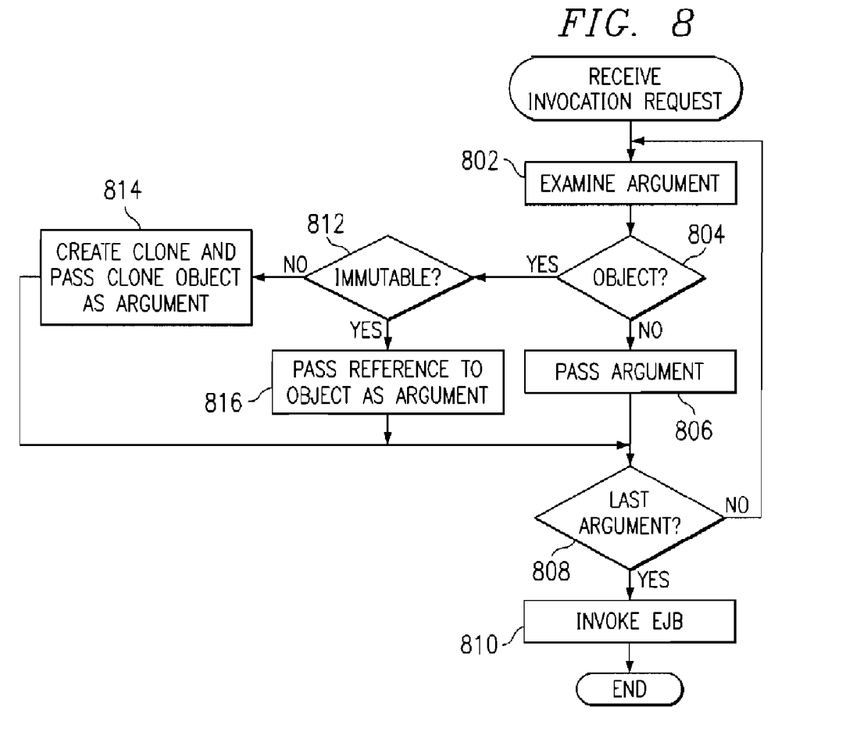
FIG. 8 is a flowchart of the operation of calling an Enterprise Java Bean in accordance with a preferred embodiment of the present invention.

Next, turning to FIG. 8, a flowchart of the operation of calling an EJB is shown in accordance with a preferred embodiment of the present invention. The process begins by receiving an invocation request and examines the first argument (step 802). A determination is made as to whether the argument is an object (step 804). If the argument is not an object, the process passes the argument (step 806) and a determination is made as to whether the argument is the last argument.

If the argument is the last argument, the process invokes the EJB (step 810) and ends. If the argument is not the last argument in step 808, the process returns to step 802 to examine the next argument.

Returning to step 804, if the argument is an object, a determination is made as to whether the object is immutable (step 812). If the object is not immutable, the process creates a clone of the object and passes the clone object as an argument (step 814). Thereafter, the process proceeds to step 808 to determine whether the argument is the last argument. If the object is immutable in step 812, the process passes a reference to the object as an argument and proceeds to step 808 to determine whether the argument is the last argument.

Thus, the present invention solves the disadvantages of the prior art by determining at class loading time whether the class is immutable. If the class is immutable and the caller resides in the same container as the called object, then a reference to the object may be passed rather than a copy of the object. The present invention allows performance to be optimized at runtime while maintaining the integrity of the EJB specification.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for loading a class, the method comprising:
    loading a class;
    inserting an immutability flag into the class;
    determining whether the class is immutable;
    setting the immutability flag if the class is immutable;
    receiving a request to invoke a server application;
    examining an argument in the request;
    if the argument is an object, identifying the class that describes the object;
    determining whether an immutability flag that is inserted into the class that describes the object is set, wherein the object is immutable if the immutability flag inserted into the class that describes the object is set;
    if the object is immutable, passing an argument to the server application that includes a reference to the object, the argument not including a copy of the object; and
    if the object is mutable, passing a copy of the object to the server application.

2. The method of claim 1, wherein the step of determining whether the class is immutable comprises:
    parsing the bytecode of the class.

3. The method of claim 2, wherein the step of determining whether the class is immutable further comprises:
    determining whether the class can be modified after it is created.

4. The method of claim 3, wherein the step of determining whether the class can be modified comprises determining whether all properties of the class are marked private.

5. The method of claim 3, wherein the step of determining whether the class can be modified comprises determining whether there are any non-private methods that update properties of the class.

6. A method in a data processing system for invoking an object, the method comprising:
    receiving, from a caller, a request to invoke an object;
    examining an argument in the request;
    if the argument is an object, determining whether the object is immutable;
    if the object is immutable, passing an argument to the caller that includes a reference to the object and does not include a copy of the object; and
    if the object is mutable, passing a copy of the object to the caller.

7. The method of claim 6, wherein the step of determining whether the object is immutable comprises:
    determining whether an immutability flag that is inserted into a class that describes the object is set.

8. An computer for loading a class, comprising:
    loading means for loading a class;
    insertion means for inserting an immutability flag into the class;
    first determination means for determining whether the class is immutable;
    setting means for setting the immutability flag if the class is immutable;
    a request to invoke a sever application, the request including an argument, the request being an object;
    a class that describes the object;
    determining means for determining whether an immutability flag that is inserted into the class that describes the object is set, wherein the object is immutable if the immutability flag inserted into the class that describes the object is set;
    if the object is immutable, an argument that is passed to the server application that includes a reference to the object and does not include a copy of the object; and
    if the object is mutable, a copy of the object being passed to the server application.

9. The apparatus of claim 8, wherein the first determination means comprises:
    parsing means for parsing the bytecode of the class.

10. The apparatus of claim 9, wherein the first determination means further comprises:
    second determination means for determining whether the class can be modified after it is created.

11. The apparatus of claim 10, wherein the second determination means comprises means for determining whether all properties of the class are marked private.

12. The apparatus of claim 10, wherein the second determination means comprises means for determining whether there are any non-private methods that update properties of the class.

13. A computer for invoking an object, comprising:
    receipt means for receiving, from a caller, a request to invoke an object;
    examination means for examining an argument in the request;
    determination means for determining whether the object is immutable if the argument is an object;
    reference means for passing an argument to the caller that includes a reference to the object and does not include a copy of the object; and
    if the object is mutable, the reference means for passing a copy of the object to the caller.

14. The apparatus of claim 13, wherein the determination means comprises:
    means for determining whether an immutability flag that is inserted into a class that describes the object is set.

15. A computer program product, in a computer readable storage medium, for loading a class, comprising:
    instructions for loading a class;
    instructions for inserting an immutability flag into the class;
    instructions for determining whether the class is immutable;
    instructions for setting the immutability flag if the class is immutable;
    instructions for receiving a request to invoke a sever application;
    instructions for examining an argument in the request;
    if the argument is an object, instructions for identifying the class that describes the object;
    instructions for determining whether an immutability flag that is inserted into the class that describes the object is set, wherein the object is immutable if the immutability flag inserted into the class that describes the object is set;

if the object is immutable, instructions for passing an argument to the server application that includes a reference to the object, the argument not including a copy of the object; and if the object is mutable, instructions for passing a copy of the object to the server application.

16. A computer program product, in a computer readable storage medium, for invoking an object, comprising:

instructions for receiving, from a caller, a request to invoke an object;

instructions for examining an argument in the request;

instructions for determining whether the object is immutable if the argument is an object; and instructions for passing an argument to the caller that includes a reference to the object and does not include a copy of the object if the object is immutable; and instructions for, if the object is mutable, passing a copy of the object to the caller.

* * * * *

UNITED STATES PATENT AND TRADEMARK OFFICE
CERTIFICATE OF CORRECTION

PATENT NO. : 7,114,152 B2  Page 1 of 1
APPLICATION NO. : 10/041127
DATED : September 26, 2006
INVENTOR(S) : Matt Richard Hogstrom et al.

It is certified that error appears in the above-identified patent and that said Letters Patent is hereby corrected as shown below:

Col. 9, line 66
  replace "An"
  with --A--.

Col. 10, line 7
  replace "sever"
  with --server--.

Col. 10, line 35
  insert --apparatus--
  between "computer" and "for"

Col. 10, line 61
  replace "sever"
  with --server--.

Signed and Sealed this

Fifth Day of December, 2006

JON W. DUDAS
*Director of the United States Patent and Trademark Office*